United States Patent [19]

Arway

[11] Patent Number: 4,845,512

[45] Date of Patent: Jul. 4, 1989

[54] DROP DEFLECTION DEVICE AND METHOD FOR DROP MARKING SYSTEMS

[75] Inventor: George Arway, Norridge, Ill.

[73] Assignee: VideoJet Systems International, Inc., Elk Grove Village, Ill.

[21] Appl. No.: 256,705

[22] Filed: Oct. 12, 1988

[51] Int. Cl.[4] .......................... G01D 15/18; B05R 5/00

[52] U.S. Cl. ....................................... 346/1.1; 346/75; 239/690

[58] Field of Search .................... 346/75, 1.1; 239/690; 307/400

[56] References Cited

U.S. PATENT DOCUMENTS

| | | | |
|---|---|---|---|
| 4,121,222 | 10/1978 | Diebold et al. | 346/75 |
| 4,319,251 | 3/1982 | Arway et al. | 346/75 |
| 4,555,712 | 11/1985 | Keur | 346/1.1 |
| 4,764,690 | 8/1988 | Murphy et al. | 307/400 |

OTHER PUBLICATIONS

"Electrostatics and Its Applications", A. D. Moore, Editor John Wiley & Sons: New York (pp. 122–129), 1973.

*Primary Examiner*—E. A. Goldberg
*Assistant Examiner*—Gerald E. Preston
*Attorney, Agent, or Firm*—Rockey and Rifkin

[57] ABSTRACT

A drop deflection device suitable for use in a drop marking system employs an electret. Electrically conductive marking drops such as inks are given an electrical charge. The drops pass between a pair of deflections plates at least one of which is formed by an electret (a dielectric material which has been subjected to corona discharge to create a relatively permanent electrically charged material body). Depending upon the presence or absence of a charge on a particular drop, it will be deflected by the field between the plates on to a substrate for marking. If uncharged, the drops continue to a collection device which returns them to the ink reservoir.

17 Claims, 3 Drawing Sheets

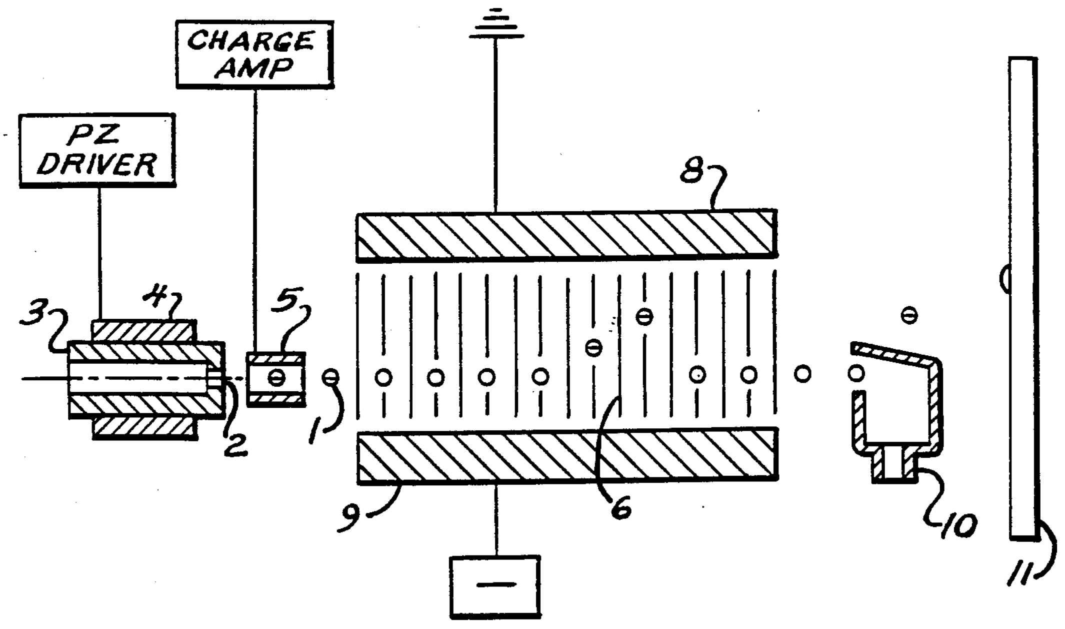
FIG. 1
FIG. 2
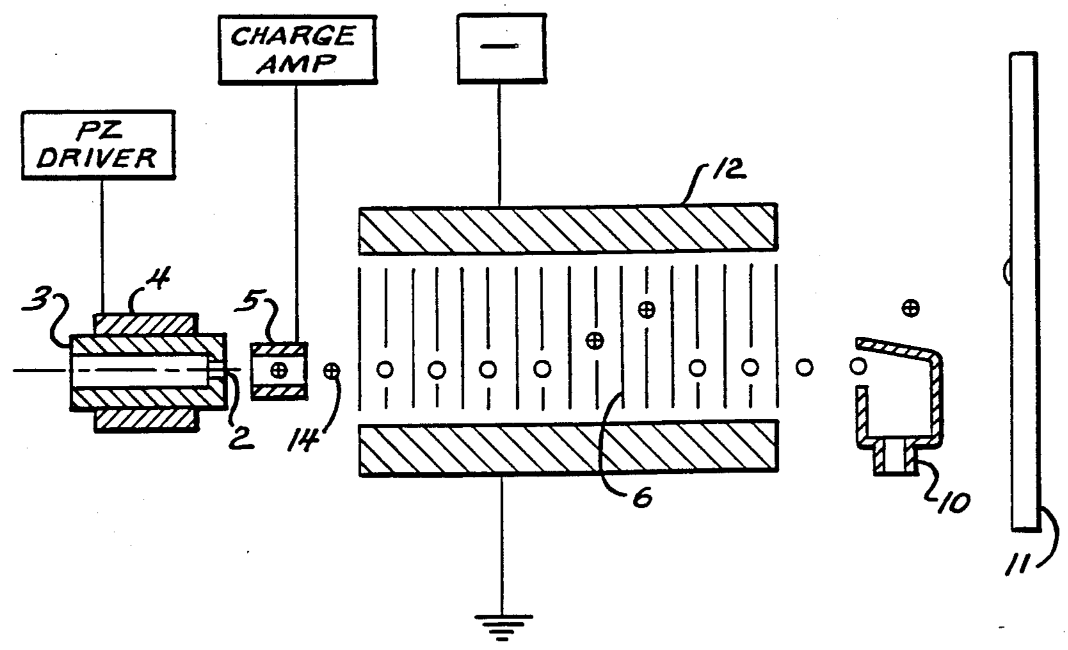

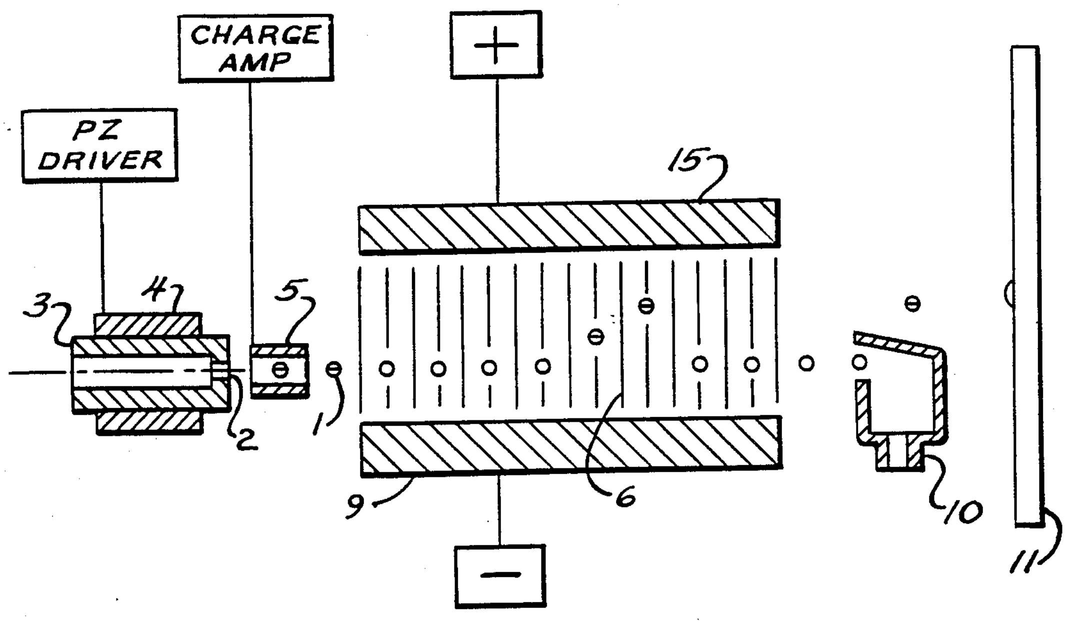
FIG. 3
FIG. 4
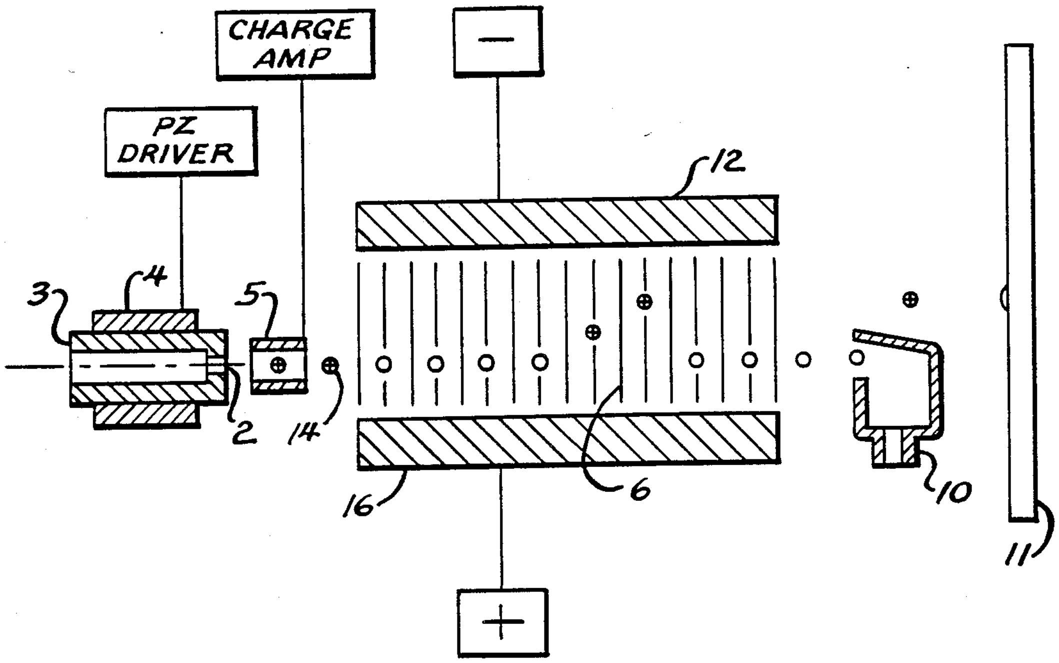

DROP DEFLECTION DEVICE AND METHOD FOR DROP MARKING SYSTEMS

BACKGROUND OF THE INVENTION

This invention relates to drop marking devices such as ink jet printers and the like. Such devices come in various forms including single drop stream devices and multiple drop stream devices such as the binary array type. Drop marking systems generally employ electrically conductive inks which are supplied to one or more nozzles which have associated therewith a piezoelectric crystal. The ink is forced through the nozzle and, by virtue of the piezoelectric device, discrete drops are informed as the ink leaves the nozzle. The drops next pass through a charging device, such as a charge ring, which selectively imparts electrical charges to them. That is, some drops are charged while others are not. The drops which are charged may have charges of different magnitudes placed thereon.

As the drops continue along their initial path, they enter an electric field formed by a pair of deflection plates. Typically, these plates are charged to a high voltage by a power supply. As the drops enter the deflection field formed between the plates, the charged drops are deflected from their original flight path by an amount proportional to the charge which they carry. Thus, uncharged drops are not deflected while highly charged drops are deflected a significant amount. In the usual case, charged drops will be deflected on to a substrate to be marked while uncharged drops are collected for return to an ink reservoir. Additional detail concerning typical ink drop marking systems can be found in U.S. Pat. Nos. 4,121,222, 4,319,251 and 4,555,712, hereby incorporated by reference.

A problem with ink jet printers of the type described occurs due to the necessity for producing the electric field for deflecting the drops. Typically, this electric field is produced by connecting one deflection plate or electrode to a high voltage power supply while connecting the second electrode to ground. Alternatively, a high voltage power supply of one polarity is connected to a first deflection electrode, and a power supply of the opposite polarity is connected to the other electrode.

The high voltage power supplies required for these purposes are responsible for several problems in the safety and performance area of the printing devices. First, the power supplies produce electrical noise which disturbs the proper functioning of the other electrical circuits associated with such printing systems, including the computer systems which determine the drop marking patterns to be placed on the substrate and associated functions. Further, arcing between deflection electrodes or elsewhere in the high voltage circuits causes poor print quality and other operational problems. With respect to safety, the power supply energy released during arcing between the deflection electrodes can create a fire hazard particularly where the inks used contained flammable solvents as is often the case. Finally, the high voltage power supplies present a possible safety hazard due to the potential for electrical shock.

Accordingly, it is desirable to eliminate the need for high voltage supplies in drop marking systems while retaining the ability to selectively deflect ink drops on to a substrate for marking purposes. Such a system would eliminate the noise and safety problems inherent in the use of high voltage power supplies to create the deflection fields.

It is accordingly an object of the present invention to provide a device which can provide a deflection field for charged drops, which device does not require the use of a high voltage power supply to maintain the deflection field.

Another object of the invention is to provide a method for deflecting charged drops without the need for employing high voltage power supplies.

A further object of the invention is to provide a deflection field of the type described by use of one or more electrets, whereby a deflection field is maintained without the need for external power supplies.

Another object of the invention is to provide an improved drop marking system in which electrical noise is reduced and accuracy of drop placement is maintained.

A further object of the invention is to provide a drop marking system which is reliable and reduced in cost and complexity.

These and other objects of the invention will be apparent from the following detailed description.

SUMMARY OF THE INVENTION

The present invention improves upon prior marking systems employing power supplies to generate an electric deflection field. The present invention eliminates the need for a high voltage power supply and the attendant electrical energy management requirements of a such a supply. According to the invention, a charged drop deflection electrode structure is provided in which one or both of the electrodes are made from an electrized material body (an electret). An electret is a substantially permanent electrically charged material body. Electrets are an electrical analog of a permanent magnet. An electret produces its own electric field without connection to a source of electrical energy. Electrets are well known in the electrical art as, for example, in microphone and speaker technology. The key element of the present invention is the use of the electret as the electric deflection field producing structure in a drop marking system.

BRIEF DESCRIPTION OF THE DRAWINGS

FIG. 1 illustrates a first embodiment of the invention utilizing a single electret.

FIG. 2 illustrates a second embodiment similar to the first embodiment wherein the drops are provided with a charge of opposite polarity.

FIG. 3 is a third embodiment in which a pair of electrets are used to form the deflection field.

FIG. 4 illustrates a fourth embodiment similar to the FIG. 3 embodiment utilizing, however, positively charged droplets.

DETAILED DESCRIPTION

Figure 5:
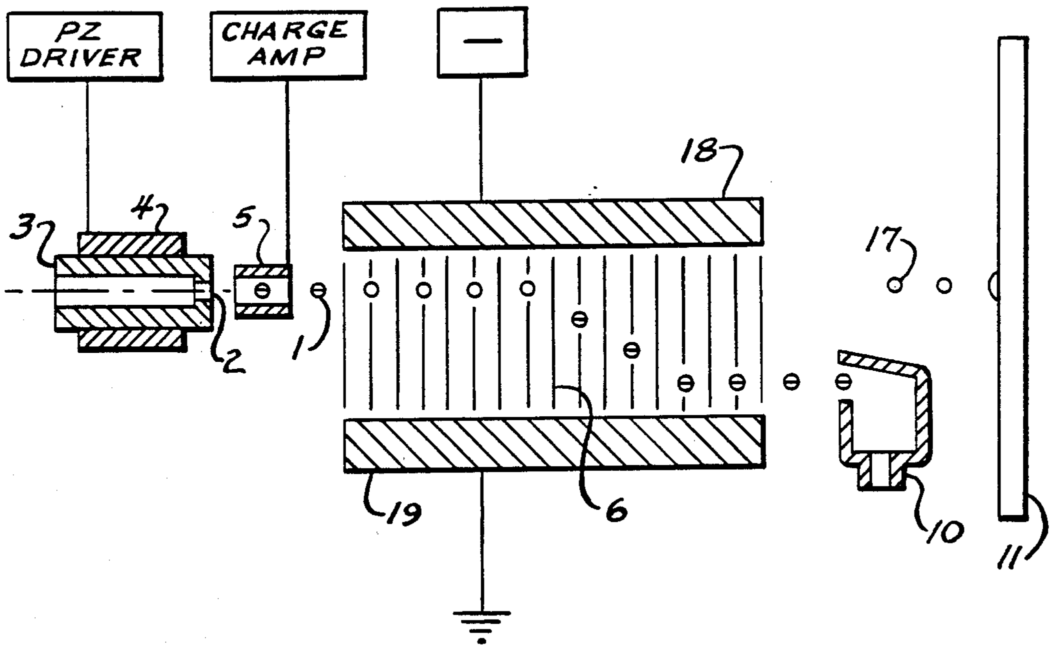
FIG. 5 illustrates a fifth embodiment employing a single negatively charged electret wherein negatively charged droplets are deflected away from the substrate while uncharged droplets strike the substrate.

Referring to figure one, there is illustrated the basic elements of a first embodiment of the invention used in conjunction with a drop marking system. Fluid marking drops 1 emanate from an ink jet nozzle orifice 2 which is located at one end of a typical nozzle housing 3. The drops are acted upon by a piezoelectric device 4 which, in the usual embodiment, surrounds the housing 3 and provides energy to the housing to cause the formation of droplets as the ink stream leaves the nozzle 2. The drops 1 are electrically charged by a charging electrode 5 as they leave the nozzle, and are deflected as they pass through an electric deflection field 6 which exists between an upper electrode 8 and a lower electrode 9. In a conventional system, electrodes 8 and 9 would be formed by a pair of conductors at least one of which would be connected to a power supply while the other conductor might be grounded or connected to a power supply of opposite polarity, thereby creating an electric deflection field between the plates as is well known in the art.

Drops which are not charged are unaffected by the electric field between the plates, and they are caught by an ink catcher 10 which returns the drops to the ink system for reuse. Drops which carry a charge are deflected by the field and caused to be deposited on a substrate 11 to be marked. In this manner, the drops can be placed such that information is recorded on the substrate 11. The deflection electrodes are usually made in the shape of flat plates, but other shapes and orientations other than parallel are also possible and within the contemplation of the present invention.

According to the present invention, as illustrated in FIG. 1, a deflection electrode 9 is made of an electret (to be described hereafter) with a negative surface potential in the range of minus 3,000 to minus 6,000 volts. Of course other surface potentials (positive or negative) can be employed depending upon the amount of deflection desired and the characteristics of the ink to be deflected. The electric field 6 which is present in the space between the two electrodes acts upon the charged drops and causes them to change the direction of their path through this field, i.e. they are deflected on to the substrate as illustrated. Specifically, the ink drops, which are negatively charged, in this embodiment, are attracted to the grounded electrode 8 which is placed in opposition to the negatively charged electret electrode 9.

Note that there is no electrical connection to the electret deflection electrode 9. The electric field 6 is the result of the intrinsic electrical charge distribution of the electret. No additional energy source, such as a power supply, is needed to establish or maintain the electric field 6. Thus, this embodiment is inherently free of the electrical noise, arcing and other safety problems such as shock hazard, which are found in conventional drop marking systems.

Referring to FIG. 2, a second embodiment of the invention is illustrated. In this embodiment, the basic system is identical to the FIG. 1 system except that the ink droplets are positively charged, and the positions of the electret electrode and the grounded electrode are reversed. Accordingly, positively charged drops are deflected from their path by the negatively charged electret electrode 12 to cause them to strike the substrate 11. Uncharged droplets still reach the catcher 10.

FIG. 3 illustrates a third embodiment in which negatively charged drops 1 are deflected into an electric field between a negative surface potential electret 9 and a positive surface potential electret 15. In this embodiment, greater field strength can be produced due to the use of a pair of oppositely charged electrets. In such an embodiment, greater deflection of the ink drops can be produced or greater printing accuracy can be obtained with the same deflection by moving the substrate closer to the deflection field.

Referring to FIG. 4, a fourth embodiment is illustrated in which positively charged drops 14 are deflected in the electric field between a positive surface potential electret 16 and a negative surface potential electret 12. This embodiment is identical to the embodiment of FIG. 3, with the exception of reversing the polarity of the ink charge and the positions of the positively charged and negatively charged electrets.

FIG. 5 illustrates a fifth embodiment in which negatively charged drops are deflected in to the catcher 10 while uncharged drops 17 are deposited on the substrate. The charged drops are deflected away from a negatively charged electret electrode 18 and toward the grounded electrode 19.

The combinations of drop charge polarity and electret surface charge polarity, illustrated in FIGS. 2–4, also apply to this fifth embodiment in which the charged drops are deflected into a catcher, while uncharged drops are directed towards the substrate.

The techniques for manufacturing commercially acceptable electrets are known to those skilled in the art. However, to ensure completeness of the disclosure, the manner in which electrets were prepared for use with the present invention will now be described. For additional information concerning electrets, reference is made to the following publication (hereby incorporated by reference): "ELECTROSTATICS AND ITS APPLICATIONS"; A. D. Moore, Editor; copyright 1973, John Wiley & Sons, Inc.; pp. 122–129, and the references cited therein.

Figure 6:
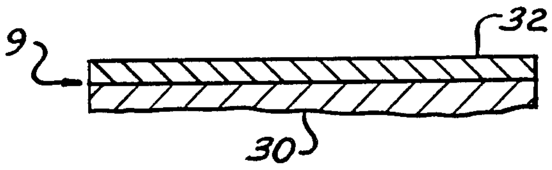
FIG. 6 illustrates the structure of one form of an electret.

Briefly, an electret is a dielectric material which has been processed so that it possesses a permanent electric surface potential, i.e. it will produce its own electric field analogous to the magnetic field carried by a permanent magnet. FIG. 6 illustrates the details of an electret which was made and successfully utilized in conjunction with the invention disclosed herein. The electret electrode is formed on a metal plate 30 which is provided as a backing only. Secured to one side of the plate 30 is a length of Teflon® tape 32 of approximately four mils thickness. The tape is preferably adhesively secured to the backing. Alternatively, thick plastic, wax or ceramic could be used to make a self-supporting electret electrode which would not need a supporting structure such as the metal plate of the illustrated embodiment.

The assembly thus prepared is then provided with a relatively permanent electrostatic charge in the following manner. A high voltage power supply such as a Spellman Model RHR10PN30 is connected to a sharp edged blade such as a craft knife or the like. The electret is charged by passing the blade near the surface of the Teflon® tape. A corona discharge is induced with the associated electric field, creating a relatively permanent charge distribution on the tape. At the time that the corona is produced, the teflon is heated to approximately 250° F. and then rapidly cooled to approximately minus 40° F., by means of a freezing mist as, for example, from a Freon® spray can. Of course, such method is not critical to practice of the invention, but merely indicates one method in which an electret material can be prepared. Other methods are known in the electret art, and can be utilized as desired. All that is necessary is that the electrets be prepared with an appropriate charge sufficient to produce the necessary deflection field for the charged ink drops. In producing and using electret electrodes, it is important to keep the surface of the teflon clean and dry to prevent loss of surface potential.

While I have shown and described a preferred embodiment of the invention, it will be appreciated that other embodiments are possible, and accordingly the invention is to be limited solely by the claims presented herewith.

What is claimed is:

1. A drop deflection device for a drop marking system employing electrically conductive ink drops comprising: a deflection electrode structure for creating an electric field disposed in the flight path of said ink drops and wherein at least a portion of said structure is an electrized material body (an electret), said ink drops being deflected from their initial flight path as a function of the polarity and magnitude of their electric charge as they pass through said electric field.

2. Claim 1 wherein said deflection electrode structure comprises a pair of spaced apart electrodes, at least one of said electrodes being an electret, said ink drop passing through the electric field created between said electrodes.

3. Claim 2 wherein said electrodes are both electrets, one electret having a negative surface potential, the other electret having a positive surface potential.

4. Claim 2 wherein one of said electrodes is an electret having a negative surface potential, the other electrode being grounded.

5. Claim 2 wherein said electrodes are parallel, spaced apart plates.

6. Claim 2 wherein said electrodes are spaced apart, diverging plates.

7. Claim 1 wherein said electret is an electret formed from a material selected from the group comprising: Lucite®, Mylar®, Teflon®, wax or ceramic.

8. A deflection electrode structure having an electric field to deflect charged droplets passing through said field said structure including at least one electrode, a portion of which is an electrized material body (an electret).

9. Claim 8 wherein said deflection electrode structure comprises a pair of spaced apart electrodes, at least one of said electrodes being an electret, said droplets passing through an electric field created between said electrodes.

10. Claim 9 wherein said electrodes are both electrets, one electret having a negative surface potential, the other electret having a positive surface potential.

11. Claim 9 wherein one of said electrodes is an electret having a negative surface potential, the other electrode being grounded.

12. Claim 8 wherein said electret is a thin-film electret formed from a material selected from the group comprising: Lucite®, Mylar®, Teflon®, wax or ceramic.

13. A deflection electrode structure having an electric field to deflect electrically charged droplets without the use of a power supply, said structure including at least one electrode, a portion of which is an electrized material body (an electret).

14. Claim 13 wherein said deflection electrode structure comprises a pair of spaced apart electrodes, at least one of said electrodes being an electret, said droplets passing through an electric field created between said electrodes.

15. Claim 14 wherein said electrodes are both electrets, one electret having a negative surface potential, the other electret having a positive surface potential.

16. Claim 14 wherein one of said electrodes is an electret having a negative surface potential, the other electrode being grounded.

17. A method of deflecting electrically charged droplets without the use of a power supply comprising the steps of:

(a) employing a deflection electrode structure in which at least a portion thereof is formed from an electrized material body (an electret).

(b) directing the droplets through the deflection electrode structure.

* * * * *